(12) United States Patent
Osumi et al.

(10) Patent No.: US 10,801,691 B2
(45) Date of Patent: Oct. 13, 2020

(54) VEHICLE DISPLAY DEVICE

(71) Applicant: OMRON Corporation, Kyoto (JP)

(72) Inventors: Yoshimasa Osumi, Kyoto (JP); Yuji Hirose, Kyoto (JP); Keiichiro Tanaka, Shiga (JP); Toshinori Yamasue, Shiga (JP)

(73) Assignee: Omron Corporation, Kyoto (JP)

( * ) Notice: Subject to any disclaimer, the term of this patent is extended or adjusted under 35 U.S.C. 154(b) by 366 days.

(21) Appl. No.: 15/876,031

(22) Filed: Jan. 19, 2018

(65) Prior Publication Data

US 2018/0141487 A1    May 24, 2018

Related U.S. Application Data

(63) Continuation of application No. PCT/JP2016/073689, filed on Aug. 11, 2016.

(30) Foreign Application Priority Data

Sep. 4, 2015   (JP) .................................. 2015-174797

(51) Int. Cl.
  *F21V 21/00*   (2006.01)
  *F21S 43/239*  (2018.01)
  (Continued)

(52) U.S. Cl.
  CPC .......... *F21S 43/239* (2018.01); *B60Q 1/2607* (2013.01); *B60Q 1/268* (2013.01);
  (Continued)

(58) Field of Classification Search
  CPC ...... B60Q 1/34; B60Q 1/2607; B60Q 1/2665; B60Q 1/26; B60Q 1/268; B60Q 1/38;
  (Continued)

(56) References Cited

U.S. PATENT DOCUMENTS

2005/0117236 A1   6/2005   Tanaka et al.
2008/0089080 A1   4/2008   Kawaji et al.
(Continued)

FOREIGN PATENT DOCUMENTS

CN   102529186 A   7/2012
CN   102555892 A   7/2012
(Continued)

OTHER PUBLICATIONS

J-Plat-Pat, English translation of 2014-234022,A, Mar. 16, 2020 (Year: 2020).*

(Continued)

*Primary Examiner* — Laura K Tso
(74) *Attorney, Agent, or Firm* — Osha Liang LLP

(57) ABSTRACT

A vehicle display device is configured for installation to a vehicle and includes a mirror element configured to reflect external light entering from a front surface toward the front surface, and a light emitting device. The light emitting device includes a light source configured to emit light, and a light guide element configured to guide incident light from the light source. The light guide element includes an emission surface configured to output incident light, and an optical-path changing portion configured to change the optical path of incident light toward the emission surface. The mirror element and the light guide element are stacked at an outer surface of the mirror element to allow the optical-path changing portion to change the optical path.

20 Claims, 14 Drawing Sheets

(51) Int. Cl.
| | |
|---|---|
| *B60R 1/06* | (2006.01) |
| *F21S 43/40* | (2018.01) |
| *F21S 43/247* | (2018.01) |
| *B60Q 1/38* | (2006.01) |
| *B60Q 1/26* | (2006.01) |
| *F21S 43/31* | (2018.01) |
| *B60Q 1/44* | (2006.01) |
| *F21S 43/245* | (2018.01) |
| *B60Q 1/50* | (2006.01) |
| *B60Q 1/34* | (2006.01) |
| *B60R 1/12* | (2006.01) |
| *F21V 8/00* | (2006.01) |

(52) U.S. Cl.
CPC ............. *B60Q 1/2665* (2013.01); *B60Q 1/34* (2013.01); *B60Q 1/38* (2013.01); *B60Q 1/44* (2013.01); *B60Q 1/503* (2013.01); *B60R 1/06* (2013.01); *B60R 1/1207* (2013.01); *F21S 43/245* (2018.01); *F21S 43/247* (2018.01); *F21S 43/31* (2018.01); *F21S 43/40* (2018.01); *B60R 2001/1215* (2013.01); *G02B 6/0036* (2013.01); *G02B 6/0055* (2013.01)

(58) Field of Classification Search
CPC ......... B60Q 1/44; B60Q 1/504; F21S 43/247; F21S 43/40; F21S 43/239; F21S 43/245; F21S 43/31; B60R 1/06; B60R 1/1207; B60R 2001/1215; G02B 6/0036; G02B 6/0055
USPC ....... 362/494, 503, 512, 511, 487, 459, 602, 362/604, 605, 623, 624, 540, 542
See application file for complete search history.

(56) References Cited

U.S. PATENT DOCUMENTS

| | | |
|---|---|---|
| 2012/0147614 A1 | 6/2012 | Schmierer |
| 2014/0226361 A1* | 8/2014 | Vasylyev ............. F21V 7/0091 362/606 |
| 2014/0254187 A1 | 9/2014 | Massault et al. |
| 2015/0316227 A1* | 11/2015 | Sahlin ................. B60Q 1/0058 362/511 |
| 2017/0192239 A1* | 7/2017 | Nakamura ......... G02B 27/0172 |
| 2019/0377125 A1* | 12/2019 | Liu ...................... G02B 6/0045 |

FOREIGN PATENT DOCUMENTS

| | | |
|---|---|---|
| DE | 102004048669 B4 | 6/2007 |
| DE | 102010045070 A1 | 3/2012 |
| EP | 2463157 A1 | 6/2012 |
| JP | H02-12941 U | 1/1990 |
| JP | 2008-094215 A | 4/2008 |
| JP | 2012131277 A | 7/2012 |
| JP | 2014-019250 A | 2/2014 |
| JP | 2014-234019 A | 12/2014 |
| JP | 2014-234022 A | 12/2014 |
| JP | 2014-534117 A | 12/2014 |
| MX | 2014005434 A | 8/2014 |

OTHER PUBLICATIONS

J-Plat-Pat, English translation of 2014-234019,A, Mar. 16, 2020 (Year: 2020).*
International Search Report issued in PCT/JP2016/073689, dated Oct. 18, 2016 (2 pages).
Written Opinion issued in PCT/JP2016/073689, dated Oct. 18, 2016 (4 pages).
Chinese Office Action issued in the counterpart Chinese Patent Application No. 201680041508.3, dated Nov. 8, 2019 (8 pages).
Notification of Reasons for Refusal issued in Japanese Application No. 2015-174797, dated May 29, 2019 (8 pages).
Office Action issued in the counterpart German Patent Application No. 112016004018.0, dated Jan. 24, 2020 (18 pages).

* cited by examiner

VEHICLE DISPLAY DEVICE

BACKGROUND

Field

The present invention relates to a vehicle display device that may be installed on a vehicle.

Related Art

It is increasingly common for a door mirror to incorporate a turn signal, allowing the door mirror with the built-in turn signal to function as a vehicle display device. Japanese Patent Publication No. 2008-94215 discloses a turn signal provided with a light source and an oblong light guide material; the turn signal is attached to the door mirror and emits light lengthwise.

However, only a portion of the door mirror body emits light among the vehicle display devices of the related art. Therefore, a vehicle display device that emits light easily visible to other vehicles is desired. The door mirror disclosed in Japanese Patent Publication No. 2008-94215 is similar. Since the oblong light guide material is simply attached to the mirror body, the door mirror has a small light emission area. Thus, a more easily visible light emitting surface area is desired.

SUMMARY

One or more embodiments of the present invention provides a vehicle display device that is easily visible from other vehicles by using a door mirror or window pane so that the mirror surface or window surface emits the light.

A vehicle display device according to one or more embodiments of the present invention is configured for installation to a vehicle and includes: a mirror element configured to reflect external light entering from a front surface toward the front surface; and a light emitting device; the light emitting device including: a light source configured to emit light; and a light guide element configured to guide incident light from the light source; the light guide element including: an emission surface configured to output incident light; and an optical-path changing portion configured to change the optical path of incident light toward the emission surface; and the mirror element and the light guide element are stacked at an outer surface of the mirror element to allow the optical-path changing portion to change the optical path.

In the vehicle display device described herein: the light guide element is panel-like, and is stacked on the mirror element at an outer surface of the mirror element.

In the vehicle display device described herein the mirror element includes: a thin-film transmissive portion configured with one surface as a front surface; and a reflective layer formed on the other surface of the transmissive portion and configured to reflect external light entering from the front surface and passing through the transmissive portion toward the front surface; and the light guide element is arranged at the other surface of the mirror element.

A vehicle display device described herein is configured for installation to a vehicle, and includes: a light emitting device; the light emitting device including: a light source configured to emit light; and a panel-like light guide element configured to guide incident light from the light source; and the light guide element including: an emission surface configured to output incident light from the light source; and an optical-path changing portion configured to change the path of incident light from the light source toward the emission surface; and a reflective layer formed on the surface facing the emission surface of the light guide element and configured to reflect external light entering from the emission surface and passing through the light guide element toward the emission surface.

A vehicle display device described herein is configured for installation to a vehicle and includes: a light emitting device; the light emitting device including: a light source configured to emit light; and a panel-like light guide element configured to guide incident light from the light source; and the light guide element including: an emission surface configured to output incident light from the light source; and an optical-path changing portion configured to change the path of incident light; a transmissive layer formed on the surface facing the emission surface of the light guide element and configured to allow external light entering from the emission surface and passing through the light guide element to pass therethrough; and a reflective layer configured to reflect external light passing through the transmissive layer toward the emission surface.

In the vehicle display device described herein the optical-path changing portion changes the optical path toward the outside of the host vehicle to which the vehicle display device is installed.

The vehicle display device described herein further includes: an attachment configured for mounting on a vehicle; and the light guide element is arranged so the light source emits light from near the attachment.

The vehicle display device described herein the vehicle display device is configured for installation to a vehicle to serve as a door mirror.

A vehicle display device described herein is configured for installation to a vehicle, and includes: a window material; and a light emitting device; the light emitting device including: a light source configured to emit light; and a light guide element configured to guide incident light from the light source; the light guide element including: an emission surface configured to output incident light; and an optical-path changing portion configured to change the optical path of incident light toward the emission surface; and the window material and the light guide element are stacked.

A vehicle display device described herein is configured for installation to a vehicle, and includes: a light emitting device; the light emitting device including: a light source configured to emit light; and a panel-like light guide element configured to guide incident light from the light source, and to serve as window material; the light guide element including: an emission surface configured to output incident light from the light source; and an optical-path changing portion configured to change the path of incident light from the light source toward the emission surface.

The vehicle display device described herein is provided with a light emitting device that includes a light source and a light guide element that may be attached to a door mirror or a window pane, and the vehicle display device is configured to emit light.

Effects

A vehicle display device according to embodiments of the present invention may be applied to a door mirror or window pane configured for installation to a vehicle. The vehicle display device is provided with a light emitting device which includes a light source and a light guide element, where the light emitting device changes the path light travels so the that the mirror surface or window surface radiates light and the light is emitted. Thus, embodiments of the present invention exhibit superior benefits, such as improving the visibility to other vehicles.

DETAILED DESCRIPTION

Embodiments of the present invention are described in detail with reference to the drawings. Note that the following working example is merely an embodiment of the present invention and in no way limits the technical character of the present invention.

First Embodiment

Figure 1:
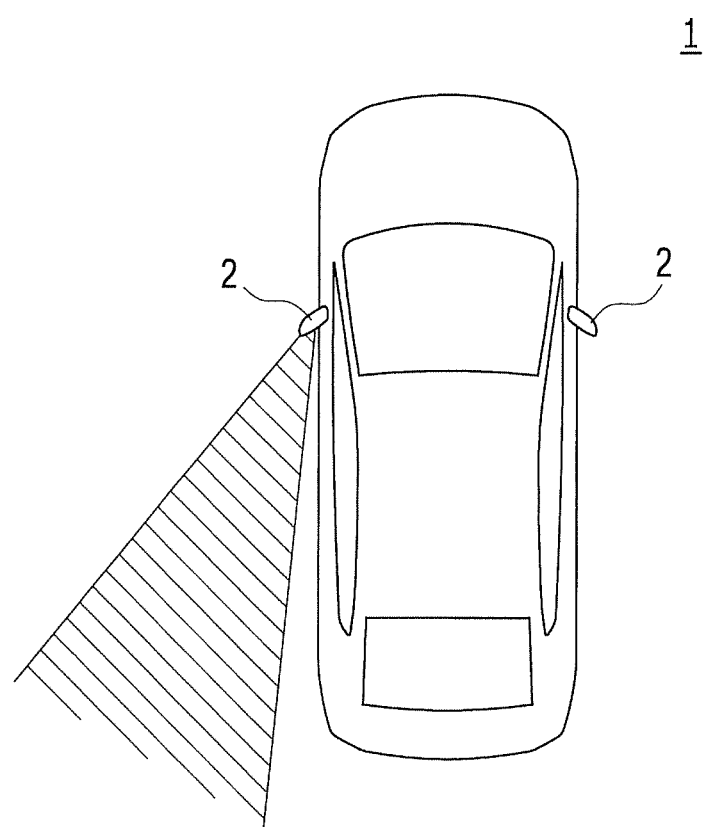
FIG. 1 is a schematic plan view illustrating an example of the external features of a vehicle with a door mirror mounted thereon; and the door mirror using a vehicle display device according to a first embodiment of the present invention.

FIG. 1 is a schematic plan view illustrating an example of the external features of a vehicle with a door mirror mounted thereon, the door mirror using a vehicle display device according to a first embodiment of the present invention; The reference number 1 represents a vehicle; a vehicle display device according to an embodiment of the invention is adopted in a door mirror 2 which is installed on the vehicle 1. The door mirror 2 includes a built-in light emitting device 3 (later described; refer to FIG. 3); the light emitting device 3 emits highly directional light. FIG. 1 is a plan view of the vehicle 1 and depicts the range of visibility for light emitted from the light emitting device 3 installed in the left-side door mirror 2 as oblique lines. The light emitting device 3 emits directional light that is oriented outward from the host vehicle 1. Thus light emitted from the light emitting device 3 can be seen outside the vehicle 1 as illustrated in FIG. 1, for instance in a vehicle behind the vehicle 1. However, passengers in the vehicle 1, and especially the driver seated in the driver seat cannot see the light emitted from the light emitting device 3; passengers see an ordinary mirror. Note that the right side door mirror 2 (not shown) functions identically.

Figure 2A:
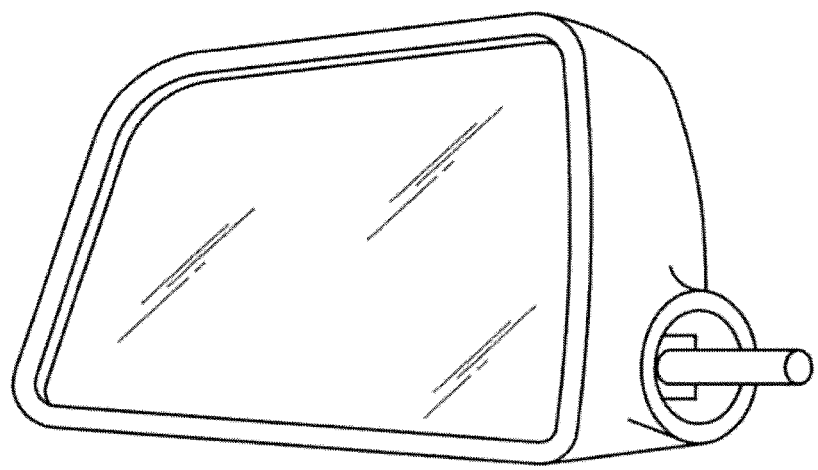
FIG. 2A and FIG. 2B are schematic perspective views illustrating an example of the external features of a door mirror that uses a vehicle display device according to the first embodiment of the present invention.
Figure 2B:
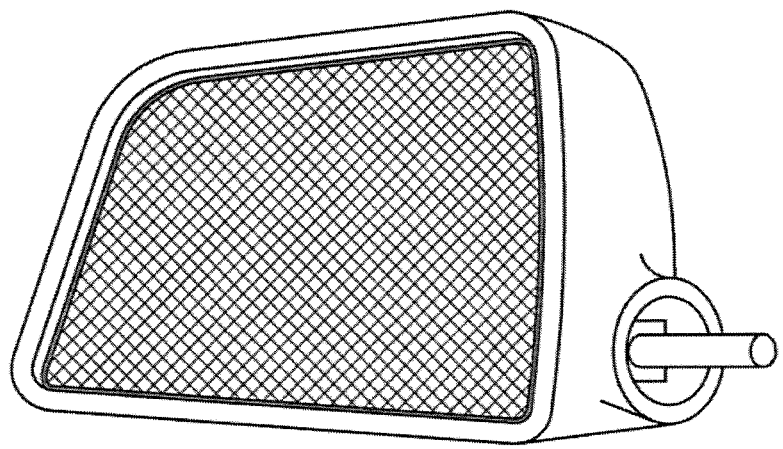

FIG. 2A and FIG. 2B are schematic perspective views illustrating an example of the appearance of a door mirror that uses a vehicle display device according to the first embodiment of the present invention; FIG. 2A illustrates the door mirror 2 in a normal state; FIG. 2B illustrates when the built-in light emitting device 3 emits light. The entire mirror surface of the door mirror 2 radiates light when the light emitting device 3 emits light. Therefore, a larger surface area radiates light compared to when the edge portion of the door mirror 2 lighting up lengthwise, for instance, the light emitted can be easily seen outside the vehicle 1, e.g., from a vehicle following the vehicle 1.

Light Emitting Device

Figure 3:
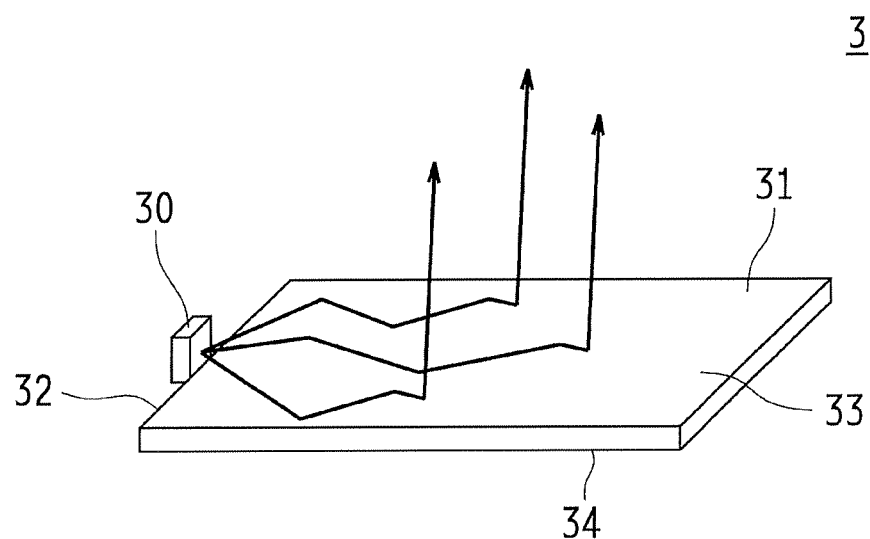
FIG. 3 is a schematic diagram for describing a light emitting device in the vehicle display device according to the first embodiment of the present invention.
Figure 4:
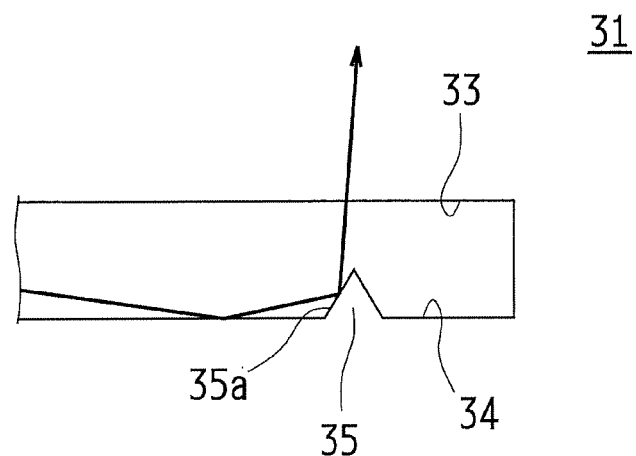
FIG. 4 is a conceptual diagram depicting an optical path through a cross section of a light emitting device in the vehicle display device according to the first embodiment of the present invention.

Next, the principles governing a light emitting device 3 in a vehicle display device (door mirror 2) according to embodiments of the invention is described. FIG. 3 is a schematic diagram for describing a light emitting device provided to the vehicle display device according to the first embodiment of the present invention; and FIG. 4 is a conceptual diagram depicting an optical path through a cross section of a light emitting device in a vehicle display device according to the first embodiment of the present invention. Note that the drawings are provided as outlines or schematic views to facilitate a simple and easy-to-understand description. There are also cases where the drawings referenced in the description contain elements that are not drawn to scale in terms of the horizontal and vertical proportions or the spaces between components.

The light emitting device 3 is provided with a light source 30 that emits light and a light guide plate 31 (light guide element) that guides the incident light from the light source 30. The light source 30 may be configured using a light emitting element such as an LED with the light emitted from the light source 10 entering the light guide plate 31. The light guide plate 31 may be formed from a flexible thin-film material or curable sheet into a rectangular panel-like shape using a transparent resin having a high refractive index such as a polycarbonate (PC) resin or poly methyl methacrylate (PMMA) resin, or using an inorganic material such as glass. Here "panel like" indicates an object that is shorter in the thickness direction (thickness) than in the planar direction spreading out in two dimensions orthogonal to the thickness direction. That is, while the light guide plate 31 is a rectangular parallelepiped, the length thereof in the thickness direction is less than the length in a plane spreading out in two dimensions and formed by the longitudinal direction and the transverse direction.

The light source 30 is installed at one end surface in the longitudinal direction of the light guide plate 31. That is, one of the surfaces making up the short side of the rectangle in the thickness direction is the incidence end surface 32 where light emitted from the light source 30 enters. The light guide plate 31 causes light entering therein from the incidence end surface 32 to spread out in planar form in the light guide plate 31. The panel-like light guide plate 31 includes an emission surface 33 configured to emit incident light from the light source 30 and a rear surface 34 relative to and across from the emission surface 33.

A plurality of optical-path changing portions 35 are formed on the rear surface 34 of the light guide plate 31. The optical-path changing portions 35 change the path of incident light that enters from the incidence end surface 32; in other words, the optical-path changing portions 35 modifies light by a prescribed angle toward the emission surface 33. Here, the optical-path changing portions 35 are illustrated as optical surfaces formed inside the light guide plate 31, and in this particular case, as reflection surfaces 35a that reflect incident light entering from the incidence end surface 32. Oblique notches may be cut into the rear surface 34 with the inclined surfaces serving as the reflection surfaces 35a. The light entering the light guide plate 31 is directed to each of the optical-path changing portions 35, and each of the optical-path changing portions 35 modifies the optical path of light incident at positions thereon by a prescribed angle with the light exiting from the emission surface 33 toward a prescribed direction.

As illustrated in FIG. 3, the light source 30 is installed at the incidence end surface 32 of the light guide plate 31, and the incidence end surface 32 and the emission surface 33 are substantially orthogonal. Additionally, the rear surface 34 faces the emission surface 33, and the rear surface 34 is also substantially orthogonal to the incidence end surface 32. The rear surface 34 is a flat surface substantially parallel to the emission surface 33 and is provided with inclined surfaces that form the optical-path changing portions 35. The flat rear surface 34 along with the emission surface 33 directs the incident light entering the light guide plate 31 from the incidence end surface 32 via total internal reflection therebetween and function to spread the light in the light guide plate 31 in planar form. The inclined surfaces forming the optical-path changing portions 35 serve as the reflection surfaces 35a and reflect incident light entering the light guide plate 31 to modify the optical path thereof toward the emission surface 33.

That is, the light emitted from the light source 30 and incident on the light guide plate 31 from the incidence end surface 32 is repeatedly totally reflected between the emission surface 33 and the rear surface 34 within the light guide plate 31 and propagates therethrough in planar form. On arriving at a reflection surface 35a formed in the optical-path changing portions 35, the light propagating through the light guide plate 31 is reflected by the reflection surface 35a and exits to the outside from the emission surface 33.

The reflection surfaces 35a here serve as the optical-path changing portions 35. However, the optical-path changing portions 35 can have various forms so long as the optical-path changing portions 35 can change the path of incident light traveling through the light guide plate 31. For instance, the optical-path changing portions 35 may be formed as a cylindrical Fresnel lens, whereby the refraction effect of the refraction surface of the Fresnel lens (i.e. the prism surface) changes the path of the incident light. Additionally, in this case the Fresnel lens may be constituted by a plurality of parts with gaps therebetween. The optical-path changing portions 35 may also be formed as a diffraction grating whereby the diffraction effect may change the optical path of the incident light. Moreover, the reflection effect and the refraction effect of the prism may change the optical path of the incident light.

A vehicle display device provided with such kind of light emitting device 3 makes it possible to implement various kinds of door mirrors 2. Embodiments of the various internal structures possible for implementing the door mirror 2 using the vehicle display device are described.

First Embodiment

Figure 5:
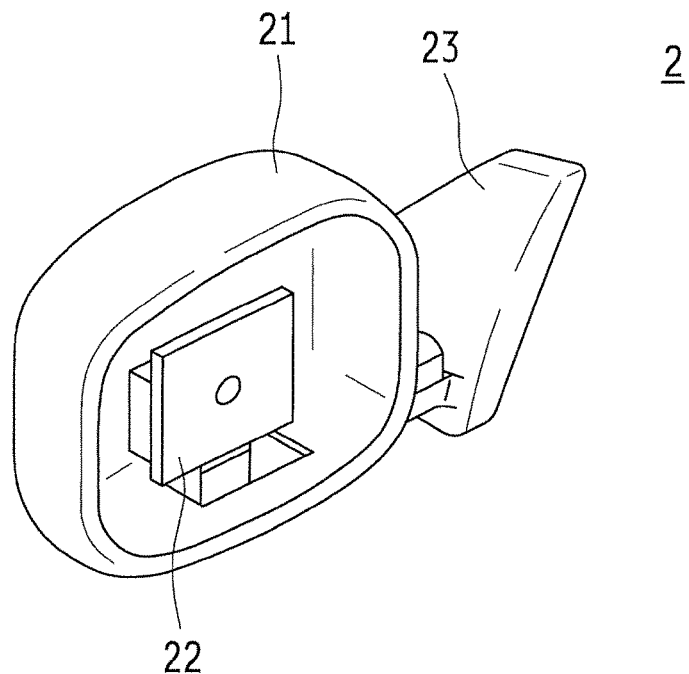
FIG. 5 is a schematic perspective view illustrating one example of a part of the internal structure for a door mirror using a vehicle display device according to the first embodiment of the present invention.
Figure 6:
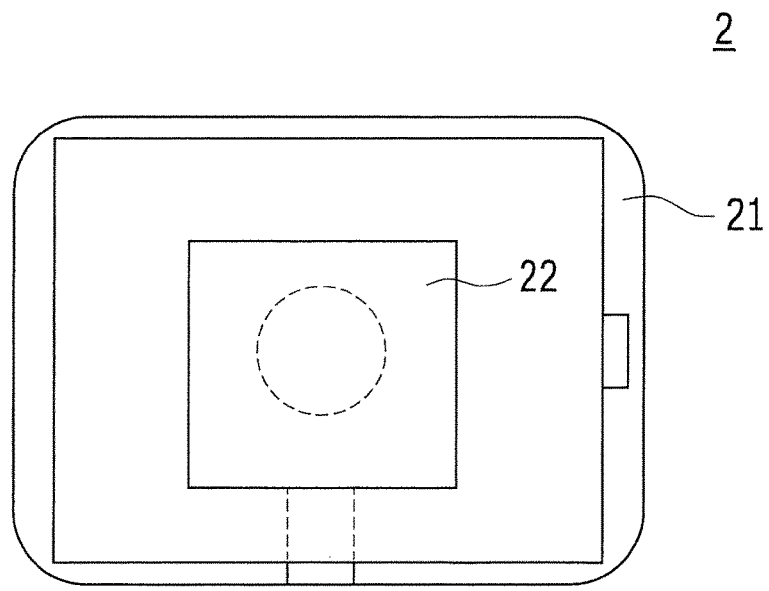
FIG. 6 is a schematic front view illustrating a part of the internal structure for a door mirror using a vehicle display device according to the first embodiment of the present invention.
Figure 7:
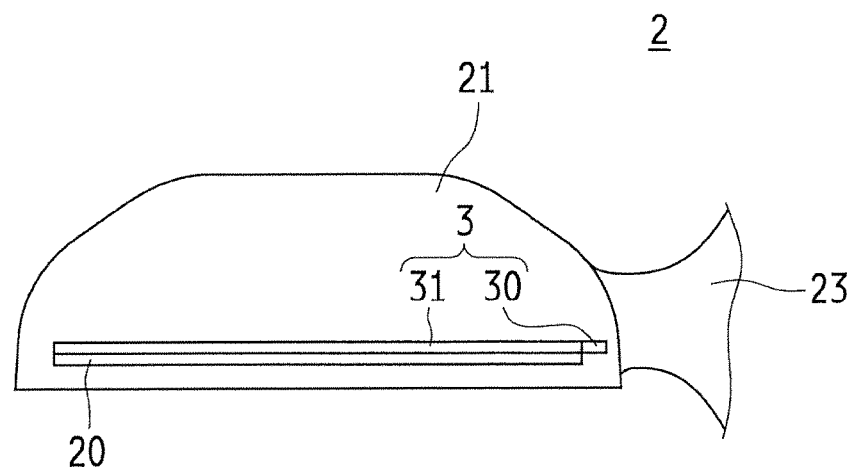
FIG. 7 is a schematic cross-sectional view illustrating a part of the internal structure for a door mirror using a vehicle display device according to the first embodiment of the present invention.
Figure 8:
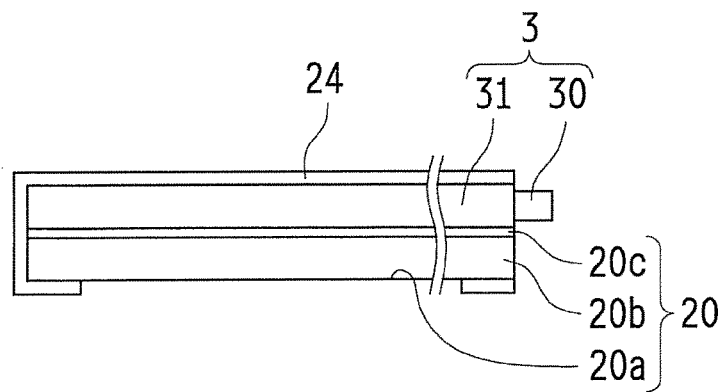
FIG. 8 is a schematic cross-sectional view illustrating a part of the internal structure for a door mirror using a vehicle display device according to the first embodiment of the present invention.

FIG. 5 is a schematic perspective view illustrating one example of a part of the internal structure for a door mirror using a vehicle display device according to the first embodiment of the present invention. FIG. 6 is a schematic front view illustrating a part of the internal structure for a door mirror using a vehicle display device according to the first embodiment of the present invention. FIG. 7 and FIG. 8 are schematic cross-sectional views illustrating a part of the internal structure for a door mirror using a vehicle display device according to the first embodiment of the present invention. FIG. 5 and FIG. 6 depict parts that can be seen when some components of the light emitting device 3 are removed from the door mirror 2. FIG. 7 schematically illustrates an arrangement of the light emitting device 3 and the mirror element 20 inside the door mirror 2 as seen from above. FIG. 8 is an exploded view of the components in the light emitting device 3 and the mirror element 20 inside the door mirror 2 as seen from above.

The door mirror 2 is provided with a housing 21 that accommodates the various components in the light emitting device 3 and the mirror element 20. The front plane of the housing 21 is open and the rim includes a gap which allows the mirror element 20 to block the opening when the mirror element 20 is fitted to the housing 21. The housing 21 is provided with a drive mechanism 22 capable of changing the angle of the mirror element 20; the mirror element is secured to the drive mechanism 22. The housing 21 may also be installed on the vehicle 1 by way of an attachment 23; the attachment 23 contains various kinds of communication wiring for connecting the various electrical components in the mirror unit 20 such as the light source 30 of the light emitting device 3 in the door mirror 2 and the drive mechanism 22 to units in the vehicle 1 such as a control device. The driver may manipulate various operational input buttons arranged near the driver seat which operates the drive mechanism 22 and adjusts the angle of the mirror element 20. Initiating operations such as a lane change may also cause the light source 30 to emit light.

A fastener frame 24 acts as a border inside the housing 21 and secures the light guide plate 31 and the mirror element 20 to the drive mechanism 22; the light guide plate 31 and the mirror element 20 are housed within the fastener frame 24 and thereby blocks the opening in the front surface of the housing 21. The fastener frame 24 includes a fastening panel at the rear so that securing the fastening panel to the drive mechanism 22 fastens the light guide plate 31 and mirror element 20 housed within the fastener frame 24 to the drive mechanism 22. The light guide plate 31 appears as a rectangle when viewed from the front, with the light guide plate 31 arranged so that the long side direction and the short side direction thereof are substantially parallel to the horizontal direction on the vertical direction respectively. The light source 30 is arranged at the light guide plate 31 near the attachment 23 emits light from near the attachment 23. Arranging the light source so that incident light enters the light guide plate from near the attachment 23 facilitates adjusting the optical path towards outside the vehicle 1. Note that the light guide plate 31 may be configured from a flexible transparent panel, and the end portion of the light guide plate 31 near the light source 30 may be bent so that the light source is arranged behind the drive mechanism 22. Even in this case, the components may be arranged so that light emitted from the light source 30 enters the light guide plate 31 from near the attachment 23.

The light guide plate 31 may be arranged behind the mirror element 20 within the fastener frame 24. The mirror element 20 and the light guide plate 31 may be securely adhered to the fastener panel as necessary with an adhesive agent. The mirror element 20 is provided a transmissive portion 20b, a front surface 20a in front of the transmissive portion 20b, and a reflective layer 20c behind the transmissive portion 20b. Light enters the mirror element 20 through the front surface 20a, passes through the transmissive portion 20b and reflects from the reflective layer 20c. The transmissive portion 20b may be produced using a resin material such as transparent polycarbonate resin or poly methyl methacrylate resin, or an inorganic material such as glass. The reflective layer 20c may be a metal-plated or vapor-deposited layer produced by plating or depositing a metal such as aluminum or silver. The reflective layer 20c reflects light entering from the front surface 20a of the mirror element 20 whereby the mirror element 20 functions as a mirror.

The door mirror 2 with a vehicle display device according to the first embodiment of the present invention applied thereto is configured with the light guide plate 31 stacked behind the mirror element 20. More specifically, the mirror element 20 and the light guide plates 31 behind the mirror element 20 are stacked so that the respective panel-like surfaces are parallel. In other words, the mirror element 20 is a thin panel-like component provided with a transmissive portion 20b, a front surface 20a as one surface on the front part of the transmissive portion 20b, and a reflective layer 20c as the other surface on the back surface of the transmissive portion 20b. Light enters the mirror element 20 through the front surface 20a, passes through the transmissive portion 20b and reflects from the reflective layer 20c toward the front surface 20a. The light guide plate 31 is arranged at the other surface of the mirror element 20.

Figure 9:
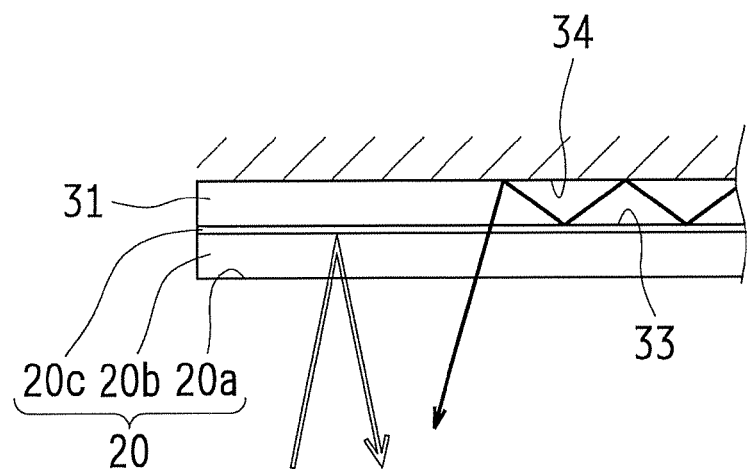
FIG. 9 is a schematic view illustrating the optical path through a light emitting device provided with a vehicle display device according to the first embodiment of the present invention.

The optical functions of the first embodiment of the present invention thusly configured are described. FIG. 9 is a conceptual diagram illustrating the optical path through the light emitting device 3 in a vehicle display device according to the first embodiment of the present invention. FIG. 9 superimposes a solid arrow and a double-line arrow over a schematic cross-sectional view of the light emitting device 3 according to the first embodiment; here, the solid arrow represents the optical path of light emitted from the light source 30, while double-line arrow represent the path of external light entering from outside. Light emitted from the light source 30 enters the light guide plate 31 from near the attachment 23. The light guide plate 31 guides the incident light from the light source 30 so that the light is repeatedly totally reflected between the emission surface 33 and the rear surface 34; the light is reflected from the optical-path changing portions 35 (omitted from FIG. 9), and exits from the emission surface 33. Light exiting the light guide plate 31 from the emission surface 33 passes through the mirror element 20 and exits from the door mirror 2.

The mirror element 20 functions as a mirror by causing external light to enter through the front surface 20a, pass through the transmissive portion 20b, and reflect from reflective layer 20c to pass through the front surface 20a to the outside. Given that the light guide plate 31 does not affect the light entering from outside, an image will not be distorted on reflection from the mirror element 20.

The first embodiment, thusly configured may be adopted in a vehicle display device with a light emitting device 3 therein to serve as a door mirror 2. The light emitting device 3 in the vehicle display device (door mirror 2) includes a light source 30 and a light guide plate 31. The vehicle display device functions identically to an ordinary mirror in a door mirror 2 when a driver in the driver seat views the door mirror 2. Outside the vehicle 1, for instance when viewed from a vehicle behind the vehicle 1, the entire mirror surface of the vehicle display device functions as a light emitting device 3 capable of emitting light, and the emission of light may provide various alerts on the operation of the vehicle, e.g., indicating the direction of the vehicle and the like. More specifically, the vehicle display device operates as a turn indicator (i.e., turn signal) when one of the left or right door mirrors 2 provided to the vehicle emits light. When both vehicle display devices emit light, the vehicle display device functions as a brake indicator (i.e., brake signal). Moreover, when both vehicle display devices emit lights, and especially when blinking at predetermined intervals, the vehicle display device functions as an emergency display signal (hazard signal). Thus, the vehicle display device emits light whereby various kinds of information may be provided outside the vehicle, for instance, to the driver in a following vehicle. The mirror element 20 housed in the door mirror 2 is arranged in front of the light guide plate 31; therefore, the image reflected by the mirror element 20 does not give rise to certain phenomena such as distortion due to effects from the light guide plate 31.

Second Embodiment

The second embodiment changes the locations of the light guide plate 31 and the mirror element 20 in the vehicle display device of the first embodiment. Given that only the location of the light guide plate 31 and the mirror element 20 changes in the second embodiment and all other configurations are identical to the first embodiment, it is sufficient to reference the first embodiment for these configurations as further descriptions thereof are omitted. The identical parts in the first and second embodiments are given the same reference numerals.

Figure 10:
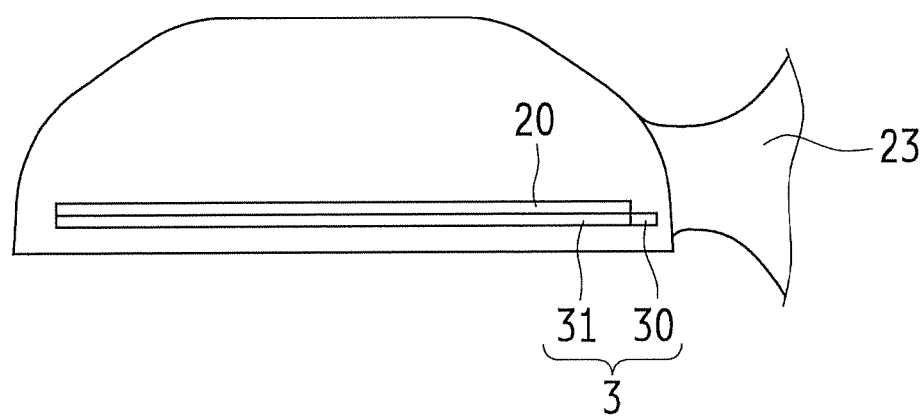
FIG. 10 is a schematic cross-sectional view illustrating an example of the internal structure for a door mirror using a vehicle display device according to a second embodiment of the present invention.

FIG. 10 is a schematic cross-sectional view illustrating an example of the internal structure for a door mirror 2 using a vehicle display device according to a second embodiment of the present invention. FIG. 10 depicts that door mirror 2 provided with a vehicle display device according to a second embodiment of the present invention, and schematically illustrates an arrangement of the light emitting device 3 and the mirror element 20 inside the door mirror 2 when viewed from above. The light guide plate 31 is arranged in front of the mirror element 20 in the vehicle display device according to the second embodiment of the present invention. More specifically, the mirror element 20 and the light guide plate 31 in front of the mirror element 20 are stacked so that the respective panel-like surfaces are parallel. In other words, the mirror element 20 is a thin panel-like component provided a transmissive portion 20b, a front surface 20a in front of the transmissive portion 20b, and a reflective layer 20c behind the transmissive portion 20b. Light enters the mirror element 20 through the front surface 20a, passes through the transmissive portion 20b and reflects from the reflective layer 20c toward the front surface 20a. The light guide plate 31 is stacked at the front surface 20a of the mirror element 20.

Figure 11:
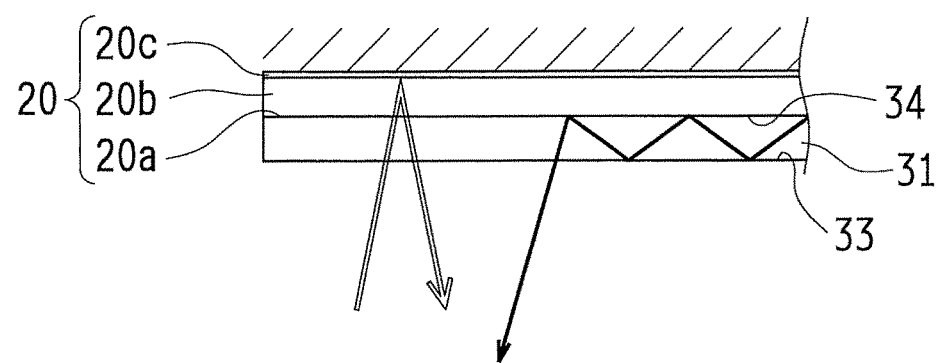
FIG. 11 is a schematic view illustrating the optical path through a light emitting device in a vehicle display device according to the second embodiment of the present invention.

The optical functions of a second embodiment of the present invention thusly configured are described. FIG. 11 is a schematic view illustrating the optical path through the light emitting device 3 in a vehicle display device according to the second embodiment of the present invention. FIG. 11 superimposes a solid arrow and a double-line arrow over a schematic cross-sectional view of the light emitting device 3 according to the second embodiment; here, the solid arrow represents the optical path of light emitted from the light source 30, while the double-line arrow represent the path of external light entering from outside. Light emitted from the light source 30 enters the light guide plate 31 from the incidence end surface 32. The light guide plate 31 guides the incident light entering from the light source 30 so that the light is repeatedly totally reflected between the emission surface 33 and the rear surface 34; the light is reflected from the optical-path changing portions 35 (omitted from FIG. 11), and exits from the emission surface 33. Light exiting the light guide plate 31 from the emission surface 33 exits from the door mirror 2. Note that light exiting the light guide plate 31 from the emission surface 33 does not need to pass through the reflective layer 20c of the mirror component 20; therefore, this allows the light emitting device 3 according to the second embodiment to emit bright light externally.

The mirror element 20 functions as a mirror by allowing the external light transmitted through the light guide plate 31 to enter through the front surface 20a, pass through the transmissive portion 20b and reflect from the reflective layer 20c to pass through the light guide plate 31 and exit to the outside. The external lights reflected by the mirror element 20 is transmitted through the light guide plate 31. However, the surface area of the reflection surfaces 35a of the optical-path changing portions 35 (i.e., the number of reflection surfaces 35a) may be smaller than the surface area of the front surface 20a. This configuration allows the mirror element 20 to function as a mirror and additionally keep the distortion of an image reflected there from at a level unrecognizable to an observer.

The second embodiment, thusly configured may be adopted in a vehicle display device with a light emitting device 3 therein to serve as a door mirror 2. The light emitting device 3 in the vehicle display device (door mirror 2) includes a light source 30 and a light guide plate 31. The vehicle display device functions identically to an ordinary mirror in a door mirror 2 when a driver in the driver seat views the door mirror 2. Outside the vehicle 1, for instance when viewed from a vehicle behind the vehicle 1, the entire mirror surface of the vehicle display device functions as a light emitting device 3 capable of emitting light, and the emission of light may provide various alerts on the operation of the vehicle, e.g., indicating the direction of the vehicle and the like. The light guide plate 31 housed in the door mirror 2 is arranged in front of the mirror element 20 and thus also allows a brighter light to be emitted therefrom.

Third Embodiment

The third embodiment uses the light guide plate 31 of the light emitting device 3 as a mirror element 20 in the vehicle display device of the first embodiment. Given that only the light guide plate 31 and the mirror element 20 changes in the third embodiment and all other configurations are identical to the first embodiment, it is sufficient to reference the first embodiment for these configurations as further descriptions thereof are omitted. The identical parts in the first and third embodiments are given the same reference numerals.

Figure 12:
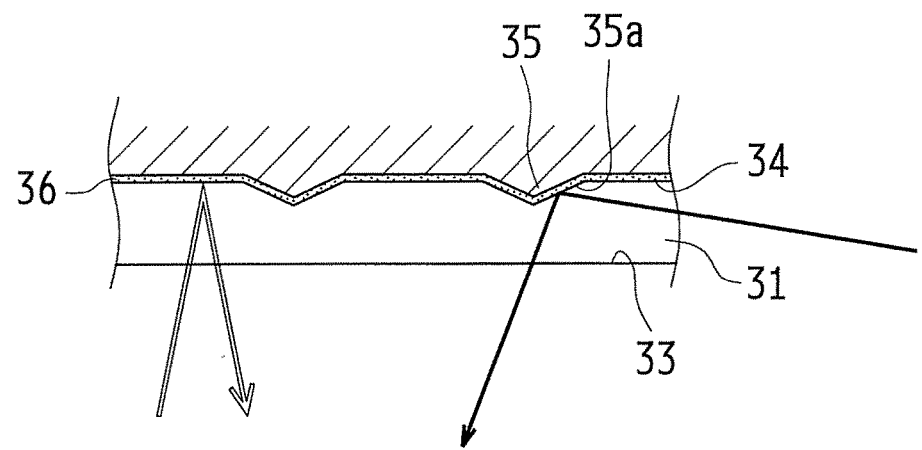
FIG. 12 is a schematic view illustrating the optical path through a light emitting device in a vehicle display device according to a third embodiment of the present invention.

FIG. 12 is a schematic view illustrating the optical path through a light emitting device 3 in a vehicle display device according to a third embodiment of the present invention. FIG. 12 superimposes a solid arrow and a double-line arrow over a schematic cross-sectional view of the light emitting device 3 according to the third embodiment; here, the solid arrow represents the optical path of light emitted from the light source 30, while the double-line arrow represent the path of external light entering from outside.

In the third embodiment the light guide plate 31 with attached light source 30 is inserted into the fastener frame 24 which is secured to the front surface of the drive mechanism 22 that is in the housing 21. The light guide plate 31 also acts as a mirror element; and no specific mirror element 20 is provided.

A metal-plated or vapor-deposited reflective layer 36 may be formed as a metal-plated or vapor-deposited layer produced on the rear surface of the light guide plate 31 in the vehicle display device according to the third embodiment of the present invention by plating or depositing a metal such as aluminum or silver. Therefore, the external light which enters from the emission surface 33 reflects from the reflective layer 36 whereby the light guide plate 31 acts as a mirror element.

Light emitted from the light source 30 enters the light guide plate 31 from the incidence end surface 32. The light guide plate 31 guides the incident light entering from the light source 30 so that the light is repeatedly totally reflected between the emission surface 33 and the rear surface 34; the light is reflected from the optical-path changing portions 35 and exits from the emission surface 33. Light exiting the light guide plate 31 from the emission surface 33 exits from the door mirror 2. In other words, the light guide plate 31 in the light emitting device 3 possesses an emission surface 33 and optical-path changing portions 35; the emission surface 33 outputs incident light that entered from the light source 30, and the optical-path changing portions 35 change the path of incident light from the light source 30 toward the emission surface 33. The light guide plate 31 further includes a reflective layer 36 formed on the rear surface 34 thereof which faces the emission surface 33; external light entering the light guide plate 31 from the emission surface 33 reflects from the reflective layer 36 toward the emission surface 33. Thus, the light guide plate 31 functions to emit light to outside of the vehicle 1 and as a mirror. Note that the light exiting the light guide plate 31 from the emission surface 33 does not need to pass through the mirror element 20 as with the second embodiment; therefore, this allows the light emitting device 3 according to the third embodiment to emit bright light externally.

The third embodiment, thusly configured may be adopted in a vehicle display device with a light emitting device 3 therein to serve as a door mirror 2. The light emitting device 3 in the vehicle display device (door mirror 2) includes a light source 30 and a light guide plate 31. The vehicle display device functions identically to an ordinary mirror in a door mirror 2 when a driver in the driver seat views the door mirror 2. Outside the vehicle 1, for instance when viewed from a vehicle behind the vehicle 1, the entire mirror surface of the vehicle display device functions as a light emitting device 3 capable of emitting light, and the emission of light may provide various alerts on the operation of the vehicle, e.g., indicating the direction of the vehicle and the like. Additionally, having the light guide plate 31 include a reflective layer 36 that acts as the mirror element 20 therefore allows the light guide plate 31 emit bright light.

Fourth Embodiment

The fourth embodiment provides a layer for protecting an outer surface of the light guide plate 31 of the third embodiment. Given that only a layer is added in the fourth embodiment and all other configurations are identical to the third embodiment, it is sufficient to reference the third embodiment for these configurations as further descriptions thereof are omitted. The identical parts in the third and fourth embodiments are given the same reference numerals.

Figure 13:
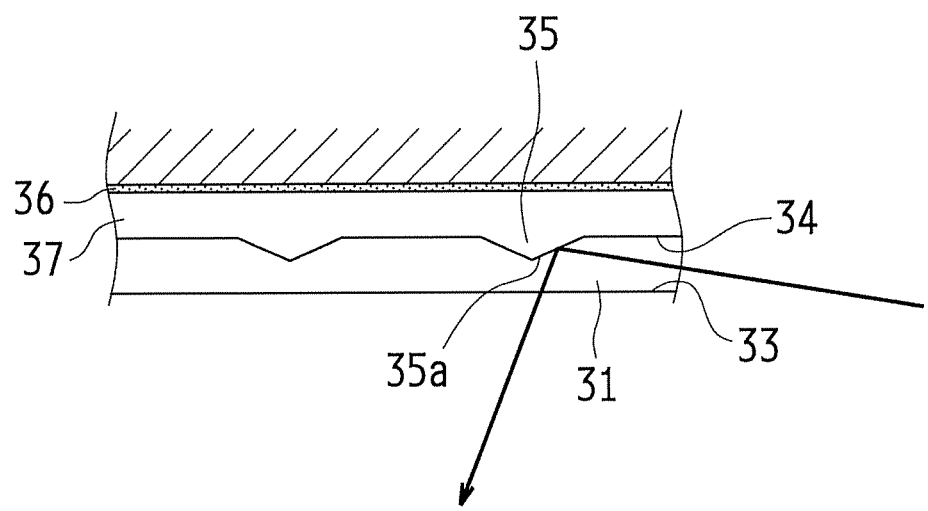
FIG. 13 is a schematic view illustrating the optical path through a light emitting device in a vehicle display device according to a fourth embodiment of the present invention.

FIG. 13 is a schematic view illustrating the optical path through a light emitting device in a vehicle display device according to a fourth embodiment of the present invention. FIG. 13 superimposes a solid arrow over a schematic cross-sectional view of the light emitting device 3 according to the fourth embodiment; here, the solid arrow represents the optical path of light emitted from the light source 30.

In the fourth embodiment the light guide plate 31 with attached light source 30, is inserted into the fastener frame 24 that is secured to the front surface of the drive mechanism 22 in the housing 21. The light guide plate 31 also acts as a mirror element; and no specific mirror element 20 is provided. A layer is formed on a surface behind the attached light guide plate 31 to protect the surface at the back of the light guide plate. The layer is produced from stacking metal-plated or vapor deposited reflective layer 36 formed by metal plating or vapor-depositing a metal such as aluminum or silver on top of a transmissive layer 37 produced from a resin material such as a transparent polycarbonate resin or a poly methyl methacrylate resin. The transmissive layer 37 is integrally molded via heat treatment or the like to the flat portions of the light guide plate 31 with no light focusing portions 35. In a light guide plate 31 thusly configured, the protective layer which includes the transmissive layer 37 and the reflective layer 36, functions as a mirror element since the external light that enters from the emission surface 33 passes through the light guide plate 31, further passes through the transmissive layer 37 and reflects from the reflective layer 36.

Light emitted from the light source 30 enters the light guide plate 31 from the incidence end surface 32. The light guide plate 31 guides the incident light entering from the light source 30 so that the light is repeatedly totally reflected between the emission surface 33 and the rear surface 34; the light is reflected from the optical-path changing portions 35 and exits from the emission surface 33. Light exiting the light guide plate 31 from the emission surface 33 exits from the door mirror 2. In other words, the light guide plate 31 in the light emitting device 3 possesses an emission surface 33 and optical-path changing portions 35; the emission surface 33 outputs incident light that entered from the light source 30, and the optical-path changing portions 35 change the path of incident light from the light source 30 toward the emission surface 33. Thus, the light guide plate 31 functions to emit light to outside of the vehicle 1 when the light source 30 emits light, and as a mirror. Note that the light exiting the light guide plate 31 from the emission surface 33 does not need to pass through the mirror element 20; therefore, this allows the light emitting device 3 according to the fourth embodiment to emit bright light externally. Moreover, the light guide plate 31 is not affected by the reflective layer 36 since no reflective layer 36 is formed at the notched portions in the rear surface 34 of the light guide plate 31 that create the optical-path changing portions 35; consequently, a light emitting device 3 according to the embodiment can present an even brighter image than the display device 1 of the third embodiment.

The fourth embodiment, thusly configured may be adopted in a vehicle display device with a light emitting device 3 therein to serve as a door mirror 2. The light emitting device 3 in the vehicle display device (door mirror 2) includes a light source 30 and a light guide plate 31. The light guide plate 31 includes a transmissive layer 37 on the rear surface 14 at the rear part facing the emission surface 33, and a reflective layer 36. The transmissive layer 37 allows external light entering from the emission surface 33 of the light guide plate 31 to pass therethrough, and the reflective layer 36 reflects the external light that passed through the transmissive layer 37 toward the emission surface 33. The external light that reflects from the reflective layer 36 passes through the transmissive layer, and exits through the emission surface 33 of the front light guide plate 31. The transmissive layer thus acts as a mirror.

Fifth Embodiment

In the fifth embodiment a vehicle display device according to the present invention is applied to a vehicle window pane. The identical parts in the first and fifth embodiments are given the same reference numerals.

Figure 14A:
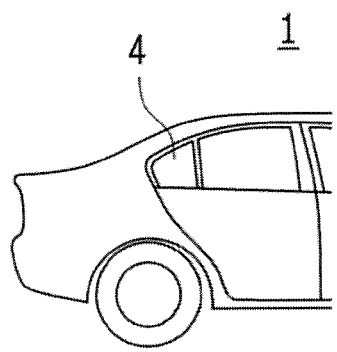
FIG. 14A, FIG. 14B, and FIG. 14C are schematic diagrams for describing an example where a vehicle display device according to a fifth embodiment of the present invention is applied to a vehicle window pane.
Figure 14B:
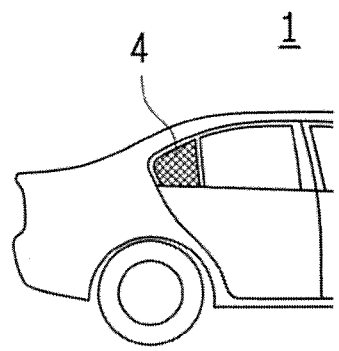
Figure 14C:
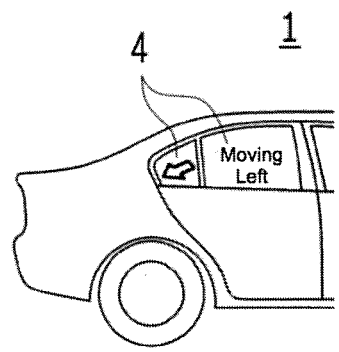

FIG. 14A, FIG. 14B, and FIG. 14C are schematic diagrams for describing an example where a vehicle display device according to the fifth embodiment of the present invention is applied to a vehicle window pane. FIG. 14A illustrates when the light emitting device 3 in the vehicle display device is not emitting light; and FIG. 14B and FIG. 14C illustrate when the light emitting device 3 in the vehicle display device emits light. The vehicle display device illustrated in FIG. 14A, FIG. 14B, and FIG. 14C is a vehicle window pane, and more specifically is a rear side window 4 in the vehicle 1. The vehicle display device functions as an ordinary window pane (FIG. 14A) when the light emitting device 3 therein does not emit light. The light emitting device 3 emits light whereby, the vehicle display device operates to provide alerts for the various operations of the vehicle such as a direction indicator (FIG. 14B). Additionally, for instance, the vehicle display device may show at least one of an arrow or textual information indicating a lane change (FIG. 14C) as a means of providing alerts to outside the vehicle for the various operations of the vehicle such as a direction indicator. Note that the display of symbol information such as an arrow, or information of a desired form such as text may be achieved by appropriately designing the locations at which the optical-path changing portions 35 are formed in the light guide plate 31 as well as the direction toward which incident light is reflected from the light guide plate 31.

Figure 15:
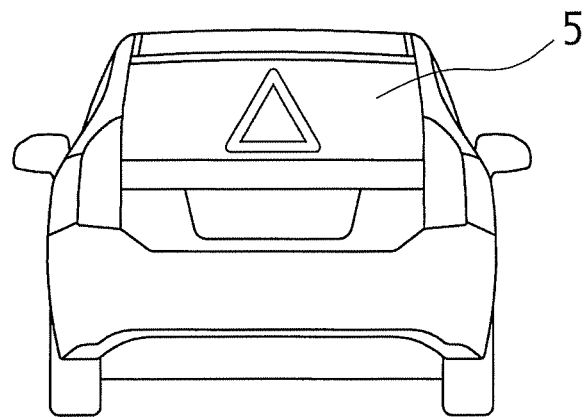
FIG. 15 is a schematic diagram for describing an example where a vehicle display device according to the fifth embodiment of the present invention is applied to a vehicle window pane.

FIG. 15 is a schematic diagram for describing an example where a vehicle display device according to the fifth embodiment of the present invention is applied to a vehicle window pane. FIG. 15 illustrates an example of modifying the configuration depicted in FIGS. 14A, 14B, and 14C; here, the vehicle display device is applied to the rear window 5 of the vehicle 1 to show a symbol modeled after the triangular display panel used for indicating an emergency stop. In this manner, the vehicle display device according to the fifth embodiment may be developed for use in various forms.

Figure 16:
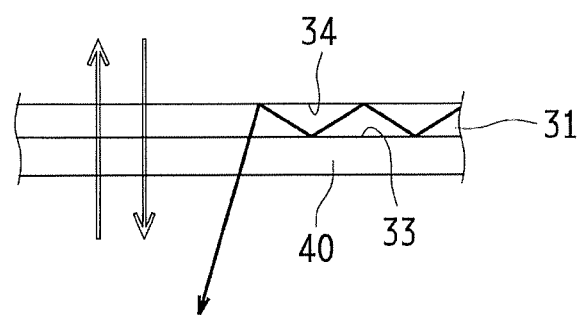
FIG. 16 is a schematic view illustrating the optical path through a light emitting device in a vehicle display device according to a fifth embodiment of the present invention.

FIG. 16 is a schematic view illustrating the optical path through a light emitting device 3 in a vehicle display device according to a fifth embodiment of the present invention. FIG. 16 superimposes a solid arrow and double-line arrows over a schematic cross-sectional view of the light emitting device 3 according to the fifth embodiment; here, the solid arrow represents the optical path of light emitted from the light source 30, while the double-line arrows from top to bottom and from bottom to top represent the path of light from inside to outside the vehicle, and light from outside to inside the vehicle respectively. The light guide plate 31 in the light emitting device 3 is stacked on the cabin facing side (top, FIG. 16) of the window material 40 used as the window panes for the rear side window 4, the rear window 5, and the like. The light guide plate 31 guides the incident light entering from the light source 30 so that the light is repeatedly totally reflected between the emission surface 33 and the rear surface 34; the light is reflected from the optical-path changing portions 35 and exits from the emission surface 33. Light exiting the light guide plate 31 from the emission surface 33 passes through the window material 40 and is emitted outside the vehicle. The window material 40 allows light to pass from outside to inside and from inside to outside the vehicle.

The fifth embodiment, thusly configured may be adopted in a vehicle display device with a light emitting device 3 therein to serve as a window pane such as a rear side window 4, a rear window 5, or the like. The light emitting device 3 in the vehicle display device (rear side window 4 and rear window 5) includes a light source 30 and a light guide plate 31. The window material 40 is stacked on the light guide plate 31 toward the outside of the vehicle. The rear side window 4 and the rear window 5 function as ordinary windowpanes when the light source 30 does not emit light, and when the light source 30 emits light operates to provide alerts for the various operations of the vehicle such as a direction indicator.

Sixth Embodiment

The sixth embodiment changes the locations of the light guide plate 31 and the window material 40 in the vehicle display device of the fifth embodiment. Given that only the location of the light guide plate 31 and the window material 40 changes in the sixth embodiment and all other configurations are identical to the fifth embodiment, it is sufficient to reference the fifth embodiment for these configurations as further descriptions thereof are omitted. The identical parts in the first and sixth embodiments are given the same reference numerals.

Figure 17:
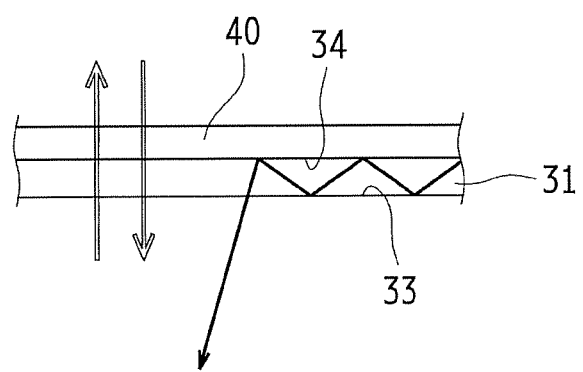
FIG. 17 is a schematic view illustrating the optical path through a light emitting device in a vehicle display device according to a sixth embodiment of the present invention.

FIG. 17 is a schematic view illustrating the optical path through a light emitting device 3 in a vehicle display device according to a sixth embodiment of the present invention. FIG. 17 superimposes a solid arrow and double-line arrows over a schematic cross-sectional view of the light emitting device 3 according to the sixth embodiment; here, the solid arrow represents the optical path of light emitted from the light source 30, while the double-line arrows from top to bottom and from bottom to top represent the path of light from inside to outside the vehicle, and light from outside to inside the vehicle respectively. The light guide plate 31 in the light emitting device 3 is stacked on the window material 40 used as the window panes for the rear side window 4, the rear window 5, and the like toward the outside of the vehicle. The light guide plate 31 guides the incident light entering from the light source 30 so that the light is repeatedly totally reflected between the emission surface 33 and the rear surface 34; the light is reflected from the optical-path changing portions 35 and exits from the emission surface 33. The window material 40 allows light to pass from outside to inside and from inside to outside the vehicle.

The sixth embodiment, thusly configured may be adopted in a vehicle display device with a light emitting device 3 therein to serve as a window pane such as a rear side window 4, a rear window 5, or the like. The light emitting device 3 in the vehicle display device (rear side window 4 and rear window 5) includes a light source 30 and a light guide plate 31. The window material 40 is stacked on the light guide plate 31 toward the inside of the vehicle. The rear side window 4 and the rear window 5 function as ordinary windowpanes when the light source 30 does not emit light, and when the light source 30 emits light operates to provide alerts for the various operations of the vehicle such as a direction indicator.

Seventh Embodiment

The seventh embodiment uses the light guide plate 31 of the light emitting device 3 as the window material 40 in the vehicle display device of the fifth embodiment. Given that only the light guide plate 31 and the window material 40 changes in the seventh embodiment and all other configurations are identical to the fifth embodiment, it is sufficient to reference the fifth embodiment for these configurations as further descriptions thereof are omitted. The identical parts in the fifth and seventh embodiments are given the same reference numerals.

Figure 18:
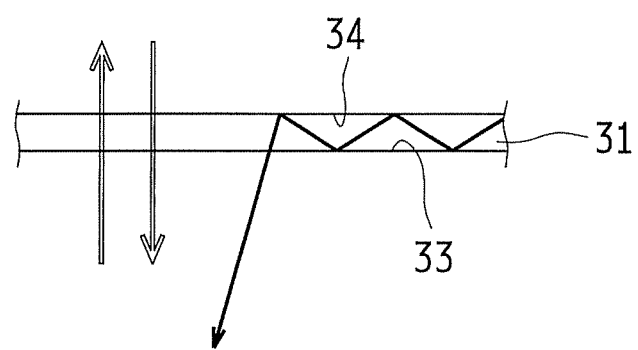
FIG. 18 is a schematic view illustrating the optical path through a light emitting device in a vehicle display device according to a seventh embodiment of the present invention.

FIG. 18 is a schematic view illustrating the optical path through a light emitting device 3 in a vehicle display device according to a seventh embodiment of the present invention. FIG. 18 superimposes a solid arrow and double-line arrows over a schematic cross-sectional view of the light emitting device 3 according to the fifth embodiment; here, the solid arrow represents the optical path of light emitted from the light source 30, while the double-line arrows from top to bottom and from bottom to top represent the path of light from inside to outside the vehicle, and light from outside to inside the vehicle respectively.

Here, the light guide plate 31 in the light emitting device 3 is serves as the window pane for the rear side window 4, the rear window 5, and the like in the seventh embodiment. The light guide plate 31 functions as the window material and as a light guide plate, and no specific window material 40 is provided. Consequently, while a flexible thin-film material may be sued as the light guide plate 31 in the fifth and sixth embodiments, the light guide plate 31 of the seventh embodiment is produced from a hardened panel like material that is durable enough to serve as a window pane. The light guide plate 31 guides the incident light entering from the light source 30 so that the light is repeatedly totally reflected between the emission surface 33 and the rear surface 34; the light is reflected from the optical-path changing portions 35 and exits from the emission surface 33. The light guide plate 31 also allows light to pass from outside to inside and from inside to outside the vehicle.

The seventh embodiment, thusly configured may be adopted in a vehicle display device with a light emitting device 3 therein to serve as a window pane such as a rear side window 4, a rear window 5, or the like. The light emitting device 3 in the vehicle display device (rear side window 4 and rear window 5) includes a light source 30 and a light guide plate 31. The rear side window 4 and the rear window 5 function as ordinary windowpanes when the light source 30 does not emit light, and when the light source 30 emits light operates to provide alerts for the various operations of the vehicle such as a direction indicator.

The present invention is not limited to the above described embodiments and may be implemented in various other ways. Therefore, in all respects the above embodiments are merely examples and should not be interpreted as limitations. The scope of the present invention is delineated by the claims and not limited by the specification. Moreover, all modifications and variations with a scope equivalent to the claims are within the scope of the present invention.

For instance, each of the aforementioned embodiments use a single light guide plate 31; the present invention is not limited thereto, and may be developed in various forms which, for example, use a plurality of light guide plates 31. Moreover, when using a plurality of light guide plates 31, all the light guide plates 31 do not need to be configured to emit light toward outside the vehicle 1. More specifically, the light guide plates 31 that emit light toward outside the vehicle may be stacked, with a light guide plate 31 arranged for emitting light in a direction where the driver is considered the observer. The light guide plate 31 designated for the driver as an observer may further include a plurality of light focusing portions configured to change the path of incident light toward the emission surface 33 causing the light output to converge toward a convergence point or convergence line outside the light guide plate or to radiate from a convergence point P or convergence line outside the light guide plate, and thereby form an image externally. The vehicle display device thusly configured may be adopted as a door mirror 2. In this case the light guide plate 31 can produce an image from light visible to the driver where the image appears to emerge from a position different from the mirror surface of the door mirror 2.

In addition, the basic principles of the door mirror 2 presented in the first through fourth embodiments may be applied to other mirrors such as a rearview mirror. Furthermore, the basic principles of the rear side window 4 and the rear window 5 presented in the fifth through seventh embodiments may be applied to other window panes such are the windshield. The vehicle display device thusly configured as herein disclosed may be applied to mirrors such as a door mirror 2, and window pane surfaces such as a rear side window 4, a rear window 5, and the like, to provide alerts for the various operations of a vehicle such as a direction indicator, brake signal, emergency signal, and the like to persons outside the vehicle. Note that the information that may be provided as an alert is not limited to the vehicles operational state. For instance, textual information may be displayed which indicates the state of the roadway being traveled, e.g., "Traffic accident ahead". Hereby, the vehicle display device may be configured to emit light for the purpose of reporting various kinds of information.

REFERENCE NUMERALS

1 Vehicle
2 Door mirror (vehicle display device)
20 Mirror element
20a Front surface
20b Transmissive portion
20c Reflective layer
3 Light emitting device
30 Light source
31 Light guide plate (light guide element)
32 Incidence end surface
33 Emission surface
34 Rear surface
35 Optical-path changing portion
35a Reflection surface
36 Reflective layer
37 Transmissive layer
4 Rear side window (vehicle display device)
5 Rear windshield (vehicle display device)
40 Window material

The invention claimed is:

1. A vehicle display device configured for installation to a vehicle, the vehicle display device comprising:
  a mirror element comprising a front surface and a transmissive portion, the mirror element configured to reflect external light entering from the front surface through the transmissive portion and toward the front surface; and
  a light emitting device;
  wherein the light emitting device comprises:
    a light source configured to emit light, and
    a light guide element configured to guide incident light from the light source,
  wherein the light guide element comprises:
    an emission surface configured to output incident light, and
    an optical-path changing portion configured to change the optical path of incident light toward the emission surface with reflection surfaces,
  wherein the mirror element and the light guide element are stacked at an outer surface of the mirror element to allow the optical-path changing portion to change the optical path, and
  wherein surface area of the reflection surfaces is smaller than surface area of the front surface,
  wherein the transmissive portion is disposed immediately between the reflection surfaces and the front surface.

2. The vehicle display device according to claim 1, wherein the light guide element is panel-like, and wherein the light guide element is stacked on the mirror element at an outer surface of the mirror element.

3. The vehicle display device according to claim 1, wherein the transmissive portion is a thin-film transmissive portion configured with one surface as a front surface,
  wherein the mirror element further comprises:
    a reflective layer formed on another surface of the transmissive portion and configured to reflect external light entering from the front surface and passing through the transmissive portion toward the front surface, and wherein the light guide element is arranged at the other surface of the mirror element.

4. A vehicle display device configured for installation to a vehicle, the vehicle display device comprising:
a light emitting device; and
a mirror element comprising a transmissive portion and a front surface, the mirror element configured to reflect external light entering from the front surface through the transmissive portion and toward the front surface,
wherein the light emitting device comprises:
a light source configured to emit light, and
a panel-like light guide element configured to guide incident light from the light source, and
wherein the light guide element comprises:
an emission surface configured to output incident light from the light source; and
an optical-path changing portion configured to change the path of incident light from the light source toward the emission surface with reflection surfaces,
wherein a reflective layer is formed on the surface facing the emission surface of the light guide element, that is configured to reflect external light that enters from the emission surface and passes through the light guide element, toward the emission surface, and
wherein surface area of the reflection surfaces is smaller than surface area of the front surface,
wherein the transmissive portion is disposed immediately between the reflection surfaces and the front surface.

5. A vehicle display device configured for installation to a vehicle, the vehicle display device comprising:
a light emitting device; and
a mirror element comprising a transmissive portion and a front surface, the mirror element configured to reflect external light entering from the front surface through the transmissive portion and toward the front surface,
wherein the light emitting device comprises:
a light source configured to emit light, and
a panel-like light guide element configured to guide incident light from the light source,
wherein the light guide element comprises:
an emission surface configured to output incident light from the light source,
an optical-path changing portion configured to change the path of incident light with reflection surfaces,
a transmissive layer formed on the surface facing the emission surface of the light guide element and configured to allow external light entering from the emission surface and passing through the light guide element to pass therethrough, and
a reflective layer configured to reflect external light passing through the transmissive layer toward the emission surface, and
wherein surface area of the reflection surfaces is smaller than surface area of the front surface,
wherein the transmissive portion is disposed immediately between the reflection surfaces and the front surface.

6. The vehicle display device according claim 1, wherein the optical-path changing portion changes the optical path toward the outside of the host vehicle to which the vehicle display device is installed.

7. The vehicle display device according to claim 1, further comprising:
an attachment configured for mounting on a vehicle,
wherein the light guide element is arranged so the light source emits light from near the attachment.

8. The vehicle display device according to claim 1, wherein the vehicle display device configured for installation to a vehicle to serve as a door mirror.

9. The vehicle display device according claim 2,
wherein the optical-path changing portion changes the optical path toward the outside of the host vehicle to which the vehicle display device is installed.

10. The vehicle display device according claim 3,
wherein the optical-path changing portion changes the optical path toward the outside of the host vehicle to which the vehicle display device is installed.

11. The vehicle display device according claim 4,
wherein the optical-path changing portion changes the optical path toward the outside of the host vehicle to which the vehicle display device is installed.

12. The vehicle display device according claim 5,
wherein the optical-path changing portion changes the optical path toward the outside of the host vehicle to which the vehicle display device is installed.

13. The vehicle display device according to claim 2, further comprising:
an attachment configured for mounting on a vehicle,
wherein the light guide element is arranged so the light source emits light from near the attachment.

14. The vehicle display device according to claim 3, further comprising:
an attachment configured for mounting on a vehicle,
wherein the light guide element is arranged so the light source emits light from near the attachment.

15. The vehicle display device according to claim 4, further comprising:
an attachment configured for mounting on a vehicle,
wherein the light guide element is arranged so the light source emits light from near the attachment.

16. The vehicle display device according to claim 5, further comprising:
an attachment configured for mounting on a vehicle,
wherein the light guide element is arranged so the light source emits light from near the attachment.

17. The vehicle display device according to claim 6, further comprising:
an attachment configured for mounting on a vehicle,
wherein the light guide element is arranged so the light source emits light from near the attachment.

18. The vehicle display device according to claim 2,
wherein the vehicle display device configured for installation to a vehicle to serve as a door mirror.

19. The vehicle display device according to claim 3,
wherein the vehicle display device configured for installation to a vehicle to serve as a door mirror.

20. The vehicle display device according to claim 4,
wherein the vehicle display device configured for installation to a vehicle to serve as a door mirror.

* * * * *